United States Patent [19]

Ramsey et al.

[11] 4,227,634
[45] Oct. 14, 1980

[54] PORTABLE CONTAINER CARRYING RACK FOR BED-TYPE DELIVERY VEHICLE

[76] Inventors: Harley L. Ramsey; Harley M. Ramsey, both of 3011 W. 76th St., Los Angeles, Calif. 90043

[21] Appl. No.: 57,908

[22] Filed: Jul. 16, 1979

[51] Int. Cl.³ .............................................. B60R 11/00
[52] U.S. Cl. .............................. 224/42.45 R; 211/74; 211/175; 280/769
[58] Field of Search .......... 224/42.43, 42.38, 42.42 R, 224/42.45 R, 273, 314–328; 108/44, 55.3, 102, 137, 157; 211/71, 74, 175; 248/154, 176, 303, 316 A; 296/3, 37.6; 280/769

[56] References Cited

U.S. PATENT DOCUMENTS

| | | | |
|---|---|---|---|
| 1,621,176 | 3/1927 | Sonin | 224/42.38 |
| 1,710,093 | 4/1929 | Kintzele | 224/42.38 |
| 2,550,019 | 4/1951 | Murphy | 248/154 X |
| 2,624,497 | 1/1953 | Newman | 224/323 X |
| 3,603,550 | 9/1971 | Byrd | 248/154 X |
| 3,877,624 | 4/1975 | Carson | 224/323 |

FOREIGN PATENT DOCUMENTS

| | | | |
|---|---|---|---|
| 585088 | 12/1924 | France | 224/42.32 |
| 1,290,264 | 3/1962 | France | 224/323 |

*Primary Examiner*—Stephen Marcus
*Attorney, Agent, or Firm*—Don H. Haycock

[57] ABSTRACT

This invention relates to a portable container carrying rack that is adaptable for carrying several various size containers concurrently on any flat bed delivery vehicle. This invention is free standing, and is particularly suitable for transporting floral objects, such as potted plants, cut flowers, and various other floral arrangements that are held in a container. The rack is likewise adaptable for transporting glass containers, such as bottled spirits, and generally for any other purpose where it is important that the container remain upright and not jar against other objects.

5 Claims, 3 Drawing Figures

PORTABLE CONTAINER CARRYING RACK FOR BED-TYPE DELIVERY VEHICLE

BACKGROUND OF INVENTION

Heretofore the delivery of fragile containers containing various types of merchandise, such as floral objects has presented the problem of restraining the container from both moving about in the delivery vehicle and remaining in an upright position while the vehicle is in motion. This has usually been accomplished by the driver of the delivery vehicle loading the containers and the contents onto the bed of the vehicle in a make-shift manner such as to provide support of the containers with any objects that happen to be accessible. This has proven unsatisfactory in many cases, particulary with the delivery of large floral arrangements where the center of gravity is sufficiently above the bed of the vehicle, so as to create an unbalancing condition whenever the container is subjected to normal driving forces, thus, creating the risk that the floral arrangement will topple and incur damage before delivery is made. This condition has further created a safety hazard, in that the driver of the vehicle is constantly paying attention to his load and giving less attention to driving the vehicle. As a result, the vehicle is driven in a manner so as to preclude, if possible, the toppling of the containers at the expense of operating the vehicle in a manner dependent upon good driving habits.

SUMMARY OF THE INVENTION

In our invention we have provided a free-standing and portable rack that may be readily moved from one delivery vehicle to another and is adaptable for carrying concurrently several containers of various sizes. Additional racks may be installed on most conventional vehicle beds to accommodate additional containers of various sizes, whenever necessary. The portable rack is provided with a skid-resistant base, and provisions for securing the containers near the bed of the truck as to as to lower the center of gravity of the containers and portable rack combination to preclude the portable rack from overturning while the delivery vehicle is in motion.

An object of this invention is to provide a portable rack for transporting fragile containers, such as containers having floral arrangements, so that the containers will remain stationery and in an upright position until removed from the delivery vehicle at the destination.

Another object of this invention is to provide a protective barrier surrounding fragile containers, such as containers for floral arrangements and various types of glass bottles, such as bottles containing liquor, so as to protect the containers from the jarring of various loose objects in the delivery vehicle, as well as possible damage from personnel during the loading and unloading of the containers.

A still further object of this invention is to provide a portable rack for carrying various types of fragile containers, that is self-standing and requires no tie down provisions.

A yet further object of this invention is to provide a portable rack for carrying various types of fragile containers that will not tip over due to customary driving forces when loaded to the maximum capacity of containers.

A yet still further object of this invention is to provide a portable rack for carrying fragile containers that is readily adjustable for carrying in one rack a multitude of such containers of various sizes and configurations.

A yet further object of this invention is to provide a portable rack for transporting fragile containers that is adaptable to the hauling beds of conventional delivery vehicles so as to make maximum utilization of the available space.

DESCRIPTION OF THE PREFERRED EMBODIMENT

Figure 1:
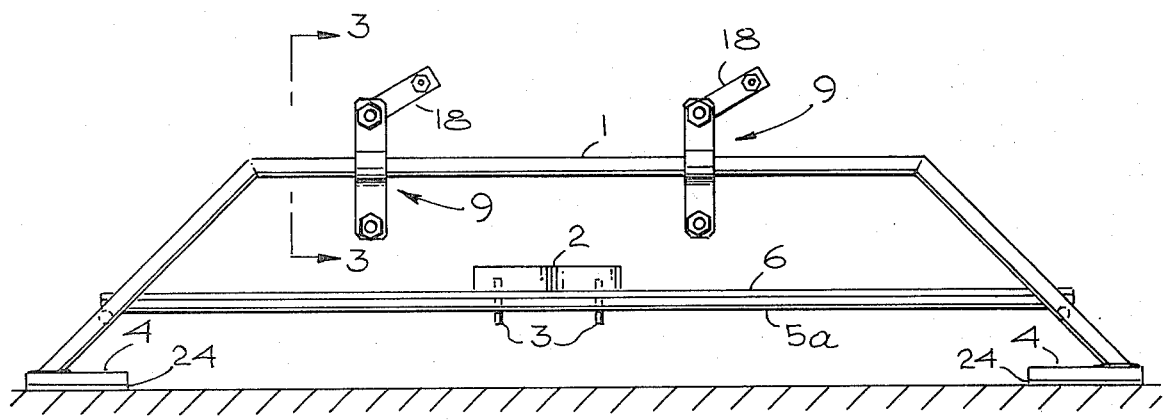
FIG. 1 shows a side view of the portable rack.

Referring to the drawings, and particularly FIG. 1, it is observed that the portable rack is supported on base members 4 that are attached to the four ends of the side tube members 1. Onto each base member 4 is attached base pad 24 for providing a high-frictional restraint to lateral movement on the vehicle bed, as will be discussed subsequently.

The base members 4 are essentially flat plates, measuring approximately three inches on a side, and are attached to the ends of side tube 1 by any conventional means, such as welding. In our preferred embodiment, base 4 and side tube 1 are both made of steel and thus are joined by welding. However, were we to use incompatible materials for base 4 and side tube 1 that could not be joined by welding, such as an aluminum side tube 1 and a steel base 4, the joining could be by other conventional means, such as attaching a vertical tab to base 4, having an opening, and bolting base 4 to side tube 1 through the opening. In FIG. 1, base members 4 are positioned at the ends of side tube 1, so as to lie in a common plane, thus utilizing all of the four base members 4 to support the portable rack. The distance between the base members 4 has been dictated by two primary considerations: First, the overall distance parallel with side tube 1 is slightly less than 48 inches so as to be accommodated crosswise in a conventional 48-inch truck bed. This would permit several portable racks to be installed side-by-side, thus making the maximum utilization of the available container carrying space. Second, the distance between the base members 4, crosswise of the side tube members 1, is based upon providing a sufficient countermoment restraining balance on the maximum container load, while maximizing on the utilization of available space by not extending the base members 4 beyond the distance reasonably necessary to keep the rack upright when the maximum load of containers are secured therein, as will be described subsequently. In our preferred embodiment, we have found that by spacing the base members 4, 10 inches on centers allows sufficient counter balance for the maximum container load, as directed by the maximum weight and the highest center-of-gravity above the vehicle bed.

Base pad 24 is attached to the bottom of the base members 4 by any conventional means, such as cementing, so as to provide a nonskid surface at the base of base members 4 that will restrain lateral movement of the portable rack on the vehicle bed. In our preferred embodiment, we have utilized a rubberized material, similar to texture, resilience, and tread pattern of a conventional pneumatic automobile tire. However, we have also found that other types of rubber-like material, such as conventional floormat material, to be adequate. It is pointed out that numerous types of material may serve this purpose, since the main feature is to provide a skid-free surface on the base of the base members 4 to restrain the rack from moving about in the bed of the delivery vehicle when subjected to ordinary driving forces. Thus, any material that will provide a high coefficient of friction between the bed of the delivery vehicle and the bottom of the portable rack will accomplish the purpose intended.

Returning now to FIG. 1, the containers to be transported are placed upon platform 6 that is supported by platform supports 5a that run parallel to side tube members 1 and rest upon cross-members 5b, located at each end of the portable rack.

Figure 2:
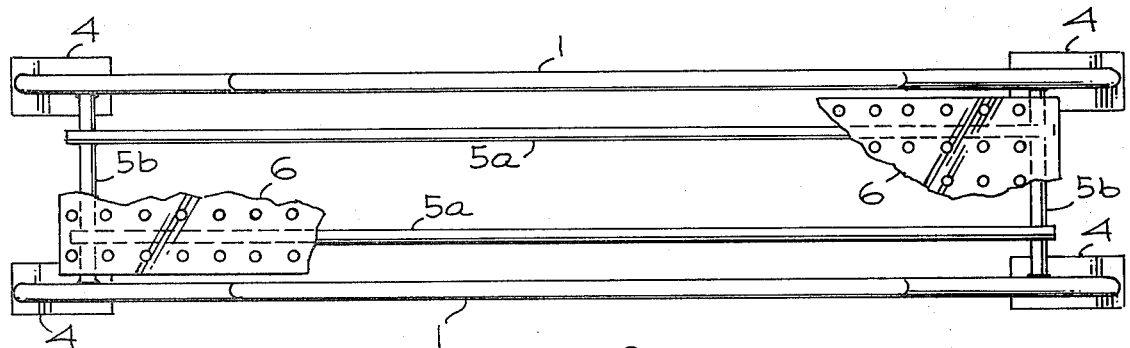
FIG. 2 shows a plan view of the portable rack.

Cross-supports 5b are attached to the side tube members 1 by welding or other conventional means that secure cross-supports 5b rigidly to the side tube members 1 at a location approximately 2.5 inches above the bottom of base pads 24. For our preferred embodiment, we have cold rolled ½ inch bar stock for platform support 5a and cross-supports 5b. Thus, we have welded platform supports 5a to cross-supports 5b at the four locations that platform support 5a rests upon cross-support 5b, as indicated in FIG. 2. Also, cross-supports 5b are welded to both side tube members 1 at the four locations indicated in FIG. 2. Platform 6 is installed upon platform support 5a by any conventional means, such as straight bolts, U bolts, or bolts and straps. It would be observed that platform 6 extends the length of platform support 5a, and has a width approximately equal to the distance between the two side tube members 1. Although platform 6 may be composed of any material that will provide sufficient rigidity to small containers and permit the installation of block 2, which will subsequently be described. In our preferred embodiment, we have selected one-quarter inch hardtempered Masonite, for platform 6, having ¼ inch openings spaced throughout on one-inch centers. The purpose for this selection is to enable the platform 6 to be adapted for all of the various sized containers that may be encountered in a normal floral delivery business. Returning to FIG. 1, block 2 sets upon platform 6 and is restrained from lateral movement by four peg 3 members that are installed in block 2 to correspond with the opening pattern of platform 6, as previously described. Thus, a smaller container could be placed upon block 2, such that it would engage the restraining means, as will be subsequently described, and will be held firmly in place with the other larger containers being transported in the same rack. In our preferred embodiment, we have determined that a block 2 of 1¼ inch thickness will raise nearly all of the smaller containers encountered in a floral delivery business to engage the restraining means.

The containers are restrained in place by the adjustable container restraint 9 being moved to engage the sides of the containers and then locked in place. The manner in which this is accomplished can be described by viewing FIG. 3 and observing the two plates 12 are deformed at approximately their midsection to the exterior curvature of the side tube 1 members. It may also be observed that each plate 12 engages the side tube members 1 at the deformed section, thus sandwiching both side tube members 1 between them. Plates 12 are restrained about both side tube members 1 by lower rod 10 and upper rod 11 that passed through the plates at openings located both above and below the deformed section of each plate. From FIG. 3, it will be observed that nut 13 has been attached opposite the upper opening in the left-hand plate and opposite the lower opening in the right-hand plate. This attachment may be by any conventional means, such as welding, provided the plate 12 and nut 13 are of compatible material. If plate 12 and nut 13 are of incompatible materials for welding, then the attachment may be by other conventional means, such as riviting.

Returning again to FIG. 3, it will be observed that both lower rod 10 and upper rod 11 have external threads 25 that mate with the internal threads of nuts 13. The lower sides of plates 12 are adjustably linked together by lower rod 10 that screws into rigidly connected nut 13 on the right-hand plate. The distance between the lower sides of plates 12 is adjustable by lock nuts 13 applied to the left-hand side of lower rod 10 on external threads 25. Adjustment of the separation distance is accomplished by torquing the nut 13, that is adjacent to plate 12, clockwise until both plates lie in approximately a vertical plane, with the horizontal plane of the base 4, when in contact with nut 13 that are adjacent to each plate. When the desired adjustment has been attained, the adjusting nut is held in place with a wrench and the nut furthest from the left-hand plate 12 is torqued clockwise into the adjusting nut 13, thus locking the two nuts to lower rod 10.

Figure 3:
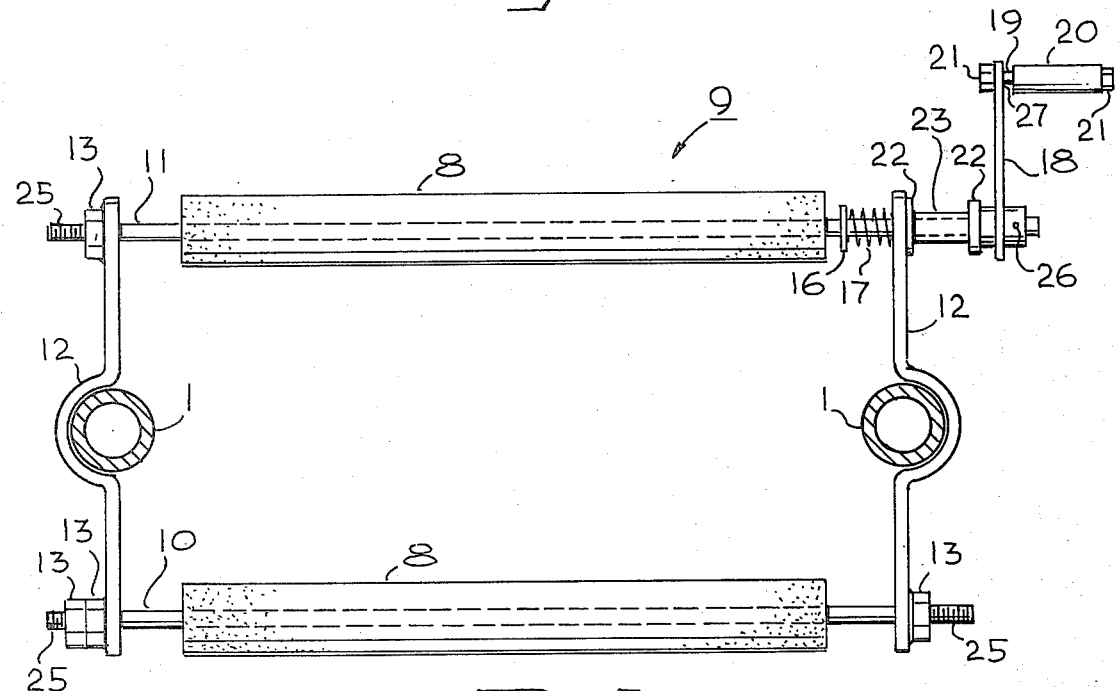
FIG. 3 shows a sectional end view illustrating the method for locking in place the container restraints.

Still referring to FIG. 3, it will be observed that upper rod 11 is screwed into the rigidly affixed nut 13 on the upper side of the left-hand plate 12. On the opposite side of upper rod 11 is attached crank arm 18 by pin 26, which passes through the hub on crank arm 18 and thence through an opening in upper rod 13, thus affixing crank arm 18 rigidly to upper rod 11. In between the hub of crank arm 18 and the upper side of the righthand plate 12 are sleeve 23 sandwiched between two washers 22. Washers 22 are installed to provide a bearing between the hub of crank handle 18 and plate 12 when crank handle 18 is turned clockwise, drawing the upper halves of plates 12 together, thus locking their deformed sections to the side tube members 1. It is pointed out that washers 22 may be eliminated without affecting the principle of operation of our invention. However, we have determined that the addition of these washers allows for a smoother cranking operation, of crank arm 18. It is observed, again, on FIG. 3, that cranksleeve 20 is installed on the end of crank handle 18 by crank journal 19 and nuts 21. This is accomplished by first screwing journal 19 into the corresponding internal threads 27 in the end of crank arm 18. Journal 19 is locked in place by nut 21 that is torqued firmly clockwise against crank arm 18 while journal 19 is held from turning. Cranksleeve 20 is then inserted over journal 19 and held in place by nut 21. In our preferred embodiment crank arm 18 is two inches overall with a distance between the center of upper rod 11 and the center of journal 19, being 1½ inches. It is made from ⅛ inch cold rolled steel strap. Sleeve 20 is 1¾ inches long and is made from a small thin-walled steel tube that slides loosely over journal 19.

As may be observed, the torquing of crank arm 18 clockwise will draw together the upper sides of plates 12, thus drawing the deformed sections of plates 12 into contact with the side tube members 1. It will be observed in FIG. 3 that the greater the torquing force applied to crank handle 18, the greater the locking force will be applied between the deformed sections of plate 12 and the respective and adjacent side tube members 1. Conversely, as crank arm 18 is turned counter clockwise, the upper rod 11 will withdraw from nut 13 extending the free distance between the upper sides of plates 12 and thus reducing the locking force applied between the deformed sections of plate 12 and the respective and adjacent side tube members 1. In the non-locking position, it will be observed that spring 17 is compressed between flange 16 and the intersurface of the upper part of right-hand plate 12, forcing it into contact with washer 22, which in turn is forced into contact against sleeve 23, which is forced against second washer 22, which is forced against the hub of crank arm 18, thus eliminating any slack between torque arm 18 and plate 12.

It may also be observed that while crank arm 18 is in the untorqued position, plates 12 are free to move along the side tube members 1 into contact with the sides of any container that can be placed between the side tube members 1.

In FIG. 3, it is observed that sponge rubber 8 is installed on both lower rod 10 and upper rod 11. This material provides a cushioning between the rod and the container being secured in the portable rack.

In FIG. 1 are shown two adjustable container restraints 9. However, any number of such restraints may be added, depending upon the size of containers for which any particular rack is used. It will be observed from FIG. 3 that the adjustable container restraints are easily removable by removing the lock nuts on the lower rod 10 and cranking crank arm 18 counter clockwise until plates 12 can be drawn over the side tube 1 members.

While we have shown the preferred embodiment of our invention, it is to be understood that various changes in the side, shape, and arrangement of parts, without departing from the spirit of the invention and the scope of the appended claims, may be made.

We claim:

1. A portable container carrying rack, comprising:
   a. a free-standing frame supported on a base, having a slab with spaced openings;
   b. a pair of similarly shaped parallel side bars having ends that connect to the base, and then from the base extend upwardly into a generally straight central section above and straddle of the slab;
   c. adjustable restraining means extending between, and moveable along, the parallel side bars for engaging the sides of containers being transported;
   d. a block having a top and a bottom side, with two or more pegs extending vertically from the bottom of the block that have diameters equal to, or less than the space openings in the slab and are positioned to correspond to the spaced openings in the slab;
   e. lockable means for locking the adjustable restraining means at any location along the parallel side bars.

2. A portable container carrying rack, as defined in claim 1, wherein the slab comprises a sheet of one-fourth inch Masonite having one-fourth inch openings therethrough on one-fourth inch centers; and, the block comprises a block of wood having one-fourth inch steel studs extending from the bottom side to correspond to the one-fourth inch hole pattern in the sheet of Masonite.

3. A portable container carrying rack, comprising:
   a. a free-standing frame supported on a base, having an attached platform above the base and connected to a pair of similarly shaped parallel side bars that have ends connected to the base and then from the base extend upwardly into a generally straight central section above and straddle of the attached platform;
   b. a first generally vertical plate with one face, adjacent to the outer side of the generally straight section of one of the side bars;
   c. a second generally vertical plate, opposite the first generally vertical plate, with one face adjacent to the outer side of the generally straight section of the other side bar such that both side bars are sandwiched between the first and second generally straight vertical plates;
   d. a concave projection on the face of the first and second generally vertical plates that are adjacent to the side bars;
   e. an opening in each vertical plate, both above and below the concave projections;
   f. a first rod, having external threads at both ends, passing through the openings in both vertical plates below the concave projection;
   g. lockable means on the first rod for restraining the relative movement of the plates, below the concave projection, beyond a maximum predetermined distance;
   h. a second bar with external threads applied to both ends, passing through the openings in both generally vertical plates above the concave projections; and,
   i. adjustable means connecting the generally vertical plates above the concave projections for drawing the plates against, and away from, their respective side bars.

4. A portable container carrying rack, as defined in claim 3, wherein the adjustable means comprise:
   a. an internal thread applied to one of the openings, in one of the plates, above the concave projection, that is mateable with the external thread applied to the second rod;
   b. a hand crank connected to the opposite end of the second rod, which is moveable along the second rod for engagement with the opposite plate;
   c. lockable means intermediate the second rod and the hand crank for locking the hand crank to the second rod.

5. A portable container carrying rack, as defined in claim 4, wherein the lockable means consist of:
   a. an opening passing through a section of the hand crank that lies on an outward projection from the center of the second rod;
   b. an opening passing through the second rod in alignment with the opening in the hand crank; and,
   c. a pin passing through both openings.

* * * * *